US012107352B2

(12) United States Patent
Ramirez-Serrano

(10) Patent No.: US 12,107,352 B2
(45) Date of Patent: Oct. 1, 2024

(54) ANTENNA FOR SENDING AND/OR RECEIVING ELECTROMAGNETIC SIGNALS

(71) Applicant: Viessmann Climate Solutions SE, Allendorf (DE)

(72) Inventor: Nelson Ramirez-Serrano, Cologne (DE)

(73) Assignee: Viessmann Climate Solutions SE, Allendorf (DE)

( * ) Notice: Subject to any disclaimer, the term of this patent is extended or adjusted under 35 U.S.C. 154(b) by 196 days.

(21) Appl. No.: 17/909,381

(22) PCT Filed: Mar. 11, 2021

(86) PCT No.: PCT/EP2021/056199
§ 371 (c)(1),
(2) Date: Sep. 4, 2022

(87) PCT Pub. No.: WO2021/204491
PCT Pub. Date: Oct. 14, 2021

(65) Prior Publication Data

US 2023/0097476 A1 Mar. 30, 2023

(30) Foreign Application Priority Data

Apr. 9, 2020 (EP) .................................... 20168944

(51) Int. Cl.
*H01Q 9/43* (2006.01)
*H01Q 1/48* (2006.01)

(52) U.S. Cl.
CPC ................ *H01Q 9/43* (2013.01); *H01Q 1/48* (2013.01)

(58) Field of Classification Search
None
See application file for complete search history.

(56) References Cited

U.S. PATENT DOCUMENTS 6,476,769 B1 * 11/2002 Lehtola .................. H01Q 5/371 343/702
9,620,852 B2 * 4/2017 Tai ........................... H01Q 1/36
(Continued)

FOREIGN PATENT DOCUMENTS

CN 101651253 A * 2/2010 ............. H01Q 1/243
EP 3188313 A1 7/2017
(Continued)

OTHER PUBLICATIONS

Communication dated Sep. 5, 2023 for EPO App. Ser. No. 23174723.9.
(Continued)

*Primary Examiner* — Ab Salam Alkassim, Jr.
*Assistant Examiner* — Anh N Ho
(74) *Attorney, Agent, or Firm* — Henricks Slavin LLP

(57) ABSTRACT

An antenna for sending and/or receiving electromagnetic signals and a method for using an antenna for sending and/or receiving electromagnetic signals. The antenna comprises an electrically conducting ground structure extending along a plane; a first structure forming a radiator, being electrically conducting; a second structure, being electrically conducting; and a feed point for connecting the antenna with a signal line. A first end of the first structure and a first end of the second structure are in electrical contact with each other at the feed point. Further, the ground structure is separated from the feed point by a gap and a second end of the second structure is connected to the ground structure. The second structure comprises a bending portion such that the second structure together with a portion of the ground structure surround an area when seen from a direction orthogonal to the plane of the ground structure.

11 Claims, 8 Drawing Sheets

(56) References Cited

U.S. PATENT DOCUMENTS

| | | | | |
|---|---|---|---|---|
| 2007/0296636 | A1 | 12/2007 | Lee | |
| 2008/0111745 | A1 | 5/2008 | Takada et al. | |
| 2009/0278745 | A1 | 11/2009 | Huang | |
| 2009/0295652 | A1 | 12/2009 | Yagi et al. | |
| 2015/0102976 | A1* | 4/2015 | Wong | H01Q 5/378 343/860 |
| 2015/0155627 | A1 | 6/2015 | Wong et al. | |
| 2016/0049732 | A1 | 2/2016 | Huang et al. | |

FOREIGN PATENT DOCUMENTS

| | | | | | |
|---|---|---|---|---|---|
| TW | 201201451 | A | * | 1/2012 | H01Q 1/2266 |
| TW | I448006 | B | * | 8/2014 | |
| TW | 201528613 | A | * | 7/2015 | H01Q 5/371 |

OTHER PUBLICATIONS

International Search Report dated Jun. 7, 2021 for PCT App. Ser. No. PCT/EP2021/056199.

Extended European Search Report dated Sep. 22, 2020 for EPO App. Ser. No. 20168944.5.

Communication dated Jul. 13, 2021 for EPO App. Ser. No. 20168944.5.

* cited by examiner

ANTENNA FOR SENDING AND/OR RECEIVING ELECTROMAGNETIC SIGNALS

BACKGROUND INFORMATION

In the field of microwave design techniques, developing small antennas to be integrated into wireless devices is a very common and laborious task. Examples for applications are WiFi, Bluetooth and Zigbee applications. These applications may be used as home automation, security systems, consumer electronics and other RF-technologies, in particular operating in the industrial, scientific, and medical (ISM) radio bands within the 2.4 GHz frequency range.

For this, many factors influencing a built-in antenna and affecting a final result have to be considered. Examples for such factors are a dielectric constant $\varepsilon_r$ of a printed board the antenna may be attached to, a dielectric constant $\varepsilon_r$ of a device housing, or a dielectric constant $\varepsilon_r$ of electronic equipment. Further factors are the location at which the antenna is incorporated and material thicknesses. All these and further parameters are taken into account to achieve an optimal antenna design for one or more applications to provide a faster, smoother and cheaper flow of data transmission while being able to place the antenna anywhere.

That means that a signal with a predefined energy can be transmitted by the antenna to a base station. To obtain such a flexibility, it is advantageous when the antenna radiates with a uniform intensity at least along one plane, for example on the azimuth plane.

Further, since devices have often a very limited size for an antenna, very compact antennas are desirable.

So far, planar inverted F-shaped antennas 800 (PIFA) as shown in FIG. 8 were mainly used for such applications. However, as shown in FIG. 9*a*, the radiation pattern 908 of the PIFA antenna 800 as shown in FIGS. 8 and 9*e* is not as isotropic as desirable in many applications. An isotropic antenna is a hypothetical antenna that radiates the same intensity of radio waves in all directions.

In U.S. Pat. No. 10,418,701 B2 an antenna device including a first and a second antenna is shown. The first antenna comprises a first monopole antenna and a loop antenna branched off from the first monopole antenna. An end of the loop antenna opposing a branching point at which the loop antenna is branched off from the first monopole antenna is short-circuited between the feeding point of the first antenna and a feeding point of the second antenna on a ground conductor.

Therefore, it is the object of the invention to design a compact and more isotropic radiation antenna.

DESCRIPTION

The subject-matter of the independent claims solves the above problems and achieves the objects of the present invention. The dependent claims are directed to preferred embodiments of the present invention.

An aspect of the present invention relates to an antenna for sending and/or receiving electromagnetic signals. The antenna comprises an electrically conducting ground structure extending along a plane; a first structure forming a radiator, being electrically conducting; a second structure, being electrically conducting; and a feed point for connecting the antenna with a signal line. The antenna may be a printed antenna, or may be manufactured by milling, cutting, etching, etc.

The antenna may be made out at least in parts of an electrically conducting material, for example, copper, silver, gold, aluminium, a combination thereof, etc.

In some implementations the antenna may be fixed on a dielectric substrate material such as FR4. FR4 is a common dielectric used in circuit boards as an insulator between a ground plane of a signal line and the signal line. A substrate may be important in antenna design to affect a size as well as a bandwidth of the antenna.

A signal line (signal trace) may be a transmission line like a stripline, a microstrip, a coplanar waveguide, a planar transmission line, etc. In some implementations the feed point may be in direct contact with a conductor of the signal line. In some embodiments the feed point may be in contact with the signal line by means of a via, a through-hole plating and/or a wire bonding.

A first end of the first structure and a first end of the second structure are in electrical contact with each other at the feed point. Further, the ground structure is separated from the feed point by a gap. The gap may be filled by air or may be filled by a dielectric. In some implementations the gap may be a physical and/or a spatial gap.

A second end of the second structure is connected to the ground structure and the second structure comprises a bending portion such that the second structure together with a portion of the ground structure surround an area, in particular an area element, when seen from a direction orthogonal to the plane of the ground structure. In some implementations at least parts of the area (area element) may be empty and/or may be filled by gas, like air, and/or by a dielectric. In some embodiments, at least parts of the second structure and/or at least parts of the ground structure may be arranged in different planes. As a result, the area may comprise irregularities and/or bumps, in particular in the direction orthogonal to the plane of the ground structure.

The antenna has the advantage that it is an easy-to-manufacture and compact antenna showing a uniform radiation characteristic.

According to an embodiment, the second structure may comprise a first portion attached to the feed point extending away from the ground structure and a second portion attached to the ground structure extending away from the ground structure, wherein distal ends of the first and second portions may be connected by the bending portion. This embodiment may have the effect that the compensation loop is connected to the ground structure. The compensation loop may form a resonator. As a result, a uniform radiating antenna may be provided in a compact manner.

According to another embodiment, the second structure and the ground structure may form a loop with a gap between the feed point and the ground structure. This may have a positive effect that an unwanted short between the feed point and the ground structure is avoided.

According to a further embodiment, the antenna may be a planar circuit antenna. This may have the advantage that the antenna may be manufactured by etching, milling and further technics known from circuit board manufacturing. Further, the plane structure of a planar circuit antenna may be advantageous in many applications with regard to the size and plane form.

In some embodiments, the first structure may be substantially U-shaped. This may have the advantage that the antenna is very compact compared to the wavelength and the radiation pattern of the antenna is very uniform.

According to an embodiment, a shorter leg of the U-shaped first structure may be connected with the feed point and a longer leg of the U-shaped radiator is open. This may have the advantage that an overall size of the antenna may be reduced, since the second structure may be arranged subsequently to the shorter leg of the first structure.

In some embodiments the U-shaped first structure may form a radiator as a whole. This may make the radiation pattern of the antenna more isotropic compared to other antennas.

According to a further embodiment, at least parts of the second structure may be surrounded from three sides by the first structure. This may have the advantage that a compensation loop formed by the second structure may be arranged in a compact manner in the inner of the shape of the first structure. As a result, the overall outer dimensions of the antenna may be reduced.

In some implementations, at least parts of the second structure may be surrounded from two sides by the first structure. This may have the advantage that the overall size of the antenna may be reduced, wherein the positive effects of a compensation loop may be used.

According to an embodiment, the feed point is a 50 Ohm feed point. This may have an advantage that the antenna can be easily connected to a commonly used 50 Ohm signal line without a matching circuit.

According to a further embodiment, the first structure may have a first portion, a second portion, and a third portion, wherein the second portion connects an end of the first portion with an end of the third portion; an extension direction of the first portion of the first structure may have a main component in a first direction in a plane parallel to the ground structure; and an extension direction of the third portion may have a main component in a second direction opposite to the first direction. This may have the advantage that the size can be reduced with minimal/without losses in the radiation power, wherein the radiation pattern may be very uniform at least along an azimuth direction.

In some embodiments, all portions, in particular the first portion, the second portion and the third portion, of the first structure may form the radiator. This means in particular that all portions of the radiator may radiate and/or receive electromagnetic waves. This may positively affect the radiation pattern in the extension direction of the first portion. In particular since the first portion of the first structure and the third portion of the second structure are configured to receive or radiate electromagnetic waves the radiation pattern in the extension direction of the first and the third structure may be more isotropic to each other.

In some embodiments the second portion and the third portion of the first structure may form a radiator.

According to another embodiment, an extension direction of the second portion of the first structure may have a main component in a direction perpendicular to the first and second directions.

In some implementations, the ground structure may form an edge in at least one of a ground plane of the signal line, a plane of the first structurer, or a plane of the second structure. This may have the advantage that the radiation pattern may be improved.

According to an embodiment, the first structure and the second structure may be attached to a dielectric substrate. This may have the advantage that a mechanical stability may be improved. Further, an influence of surrounding parameters on a frequency stability of the antenna may be reduced.

According to another embodiment, the surrounding behind and in front of the first and/or the second structure may be free from the ground structure, when seen from the direction orthogonal to the plane of the ground structure. This may have the advantage that an attenuation of the radiation in one direction, namely to a frontside or a backside of the antenna, may be avoided.

According to a further embodiment, no ground structure may be arranged behind or in front of the first and/or the second structure, when seen from the direction orthogonal to the plane of the ground structure. This may have the advantage that the radiation pattern of the antenna is more uniform.

In some embodiments the bending portion may comprise a concave bending. In some embodiments a bending of the bending portion may be formed in form of one or more corners.

Another aspect of the present invention relates to a method for using an antenna for sending and/or receiving electromagnetic signals comprising the steps of providing an antenna according to one of the above described antennas and connecting the antenna with a signal line to a signal processing unit. The signal processing unit may be a radio frequency (RF) front end. The signal line may be a feed line, in particular a 50Ω feed line. The signal processing unit, in particular an RF front end, may for example comprise a matching circuit, comparator, an oscillator, an analogue-to-digital converter and/or a mixer.

In some implementations, an antenna according to the invention may be part of an antenna array comprising a plurality of antennas.

The method may have the advantageous effect that one or more signals may be transmitted (due to reciprocity of an antenna radiated and/or received) with low power independent of the orientation of the antenna. Thus, energy may be saved and battery runtime may be improved in some embodiments. Further, electromagnetic radiation affecting organic tissues can be reduced, which may result in a lower specific absorption rate (SAR).

DETAILED DESCRIPTION

Figure 1A:
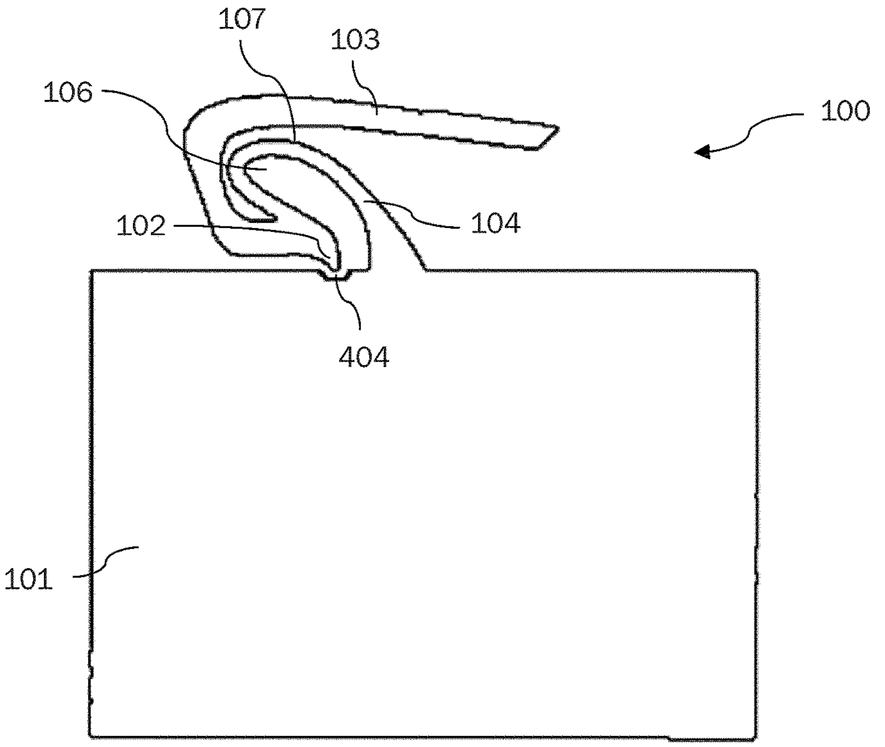
FIG. 1*a* shows schematically an example of an antenna according to an embodiment of the invention.

FIG. 1*a* shows schematically an example of an antenna according to an embodiment of the invention. The antenna 100 comprises an electrically conducting ground structure 101. Further, the antenna comprises a first structure 103, a second structure 104 and a feed point 102. The feed point 102 is configured to be connected to a signal line. The first structure 103 and the second structure 104 are electrically conducting. A first end of the first structure 103 and a first end of the second structure 104 are in electrical contact with each other at the feed point 102. The ground structure 101 is separated from the feed point 102 by a gap 404.

The gap 404 may be a physical/spatial gap. In some embodiments, the gap 404 may be filled by gas, like air, and/or may be filled by a dielectric. The ground structure being separated from the feed point 102 by the gap 404 may mean that the feed point 102 and the ground structure 101 are not in direct electrical contact with each other at the location of the feed point 102. In particular, the feed point 102 may be in electrical contact (only) through the first structure, the second structure 104 and a signal line.

A second end of the second structure 104 is electrically connected to the ground structure 101. Advantageously, the second structure may comprise a bending portion 107 such that the second structure 104 together with a portion of the ground structure 101 may at least substantially surround an area (area element) 106 as shown in FIG. 1*a*.

Figure 2A:
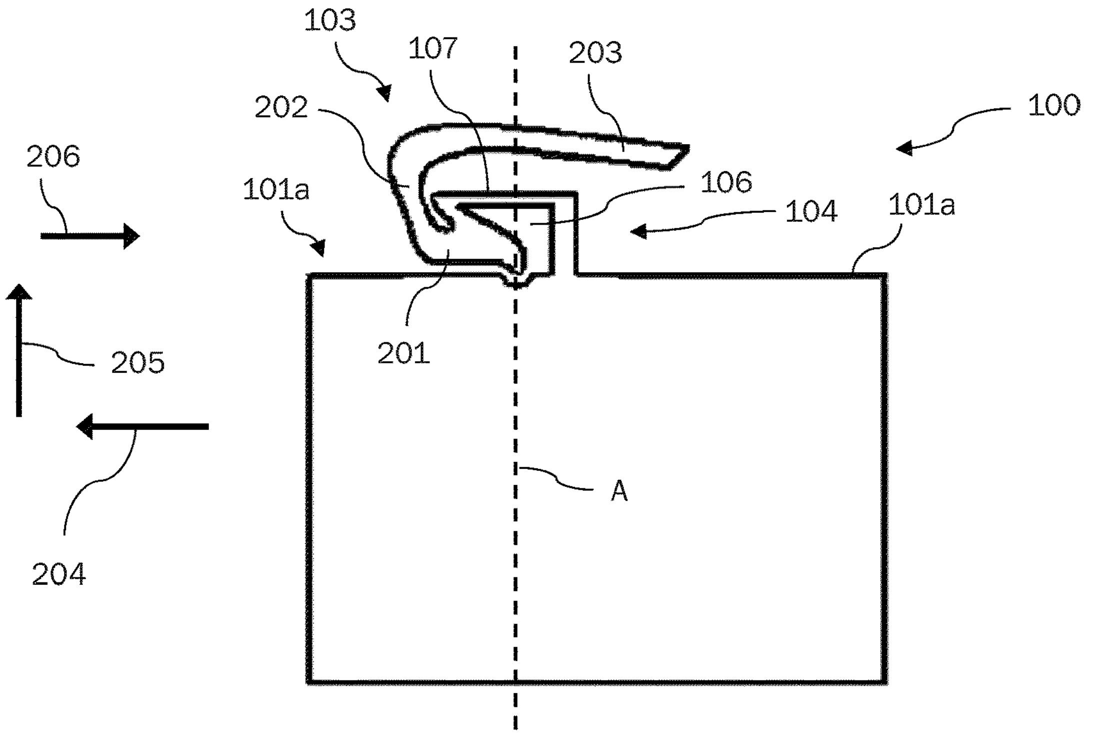
FIG. 2*a* shows schematically an example of an antenna according to an embodiment of the invention.
Figure 2B:
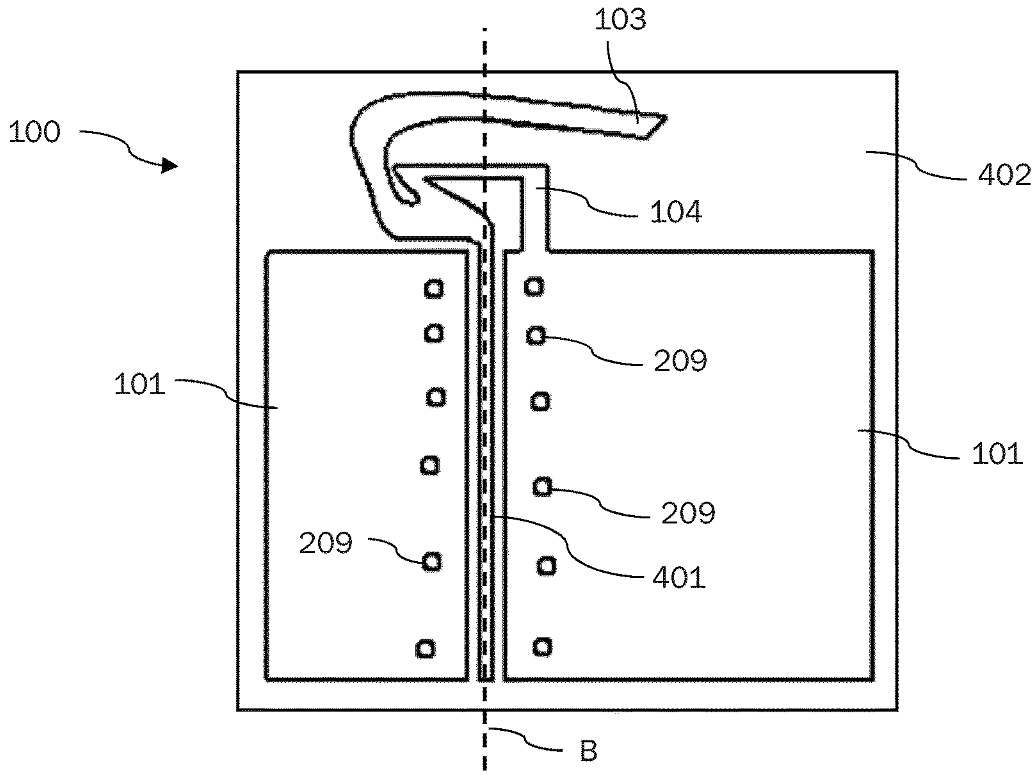
FIG. 2*b* shows schematically an example of an antenna according to an embodiment of the invention.
Figure 4A:
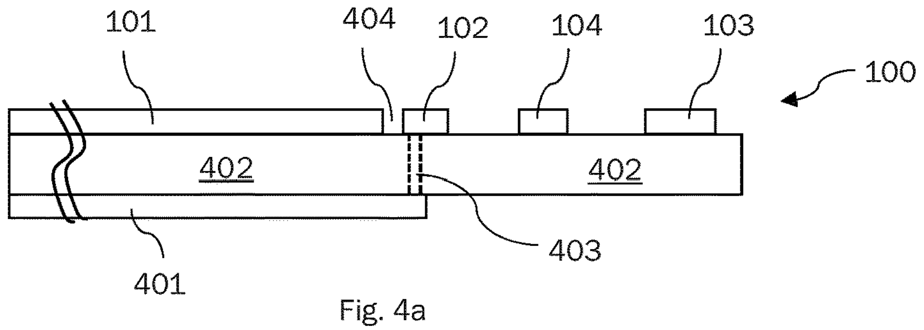
FIG. 4*a* shows schematically a cross-section of an example of an antenna according to an embodiment of the invention.
Figure 4B:
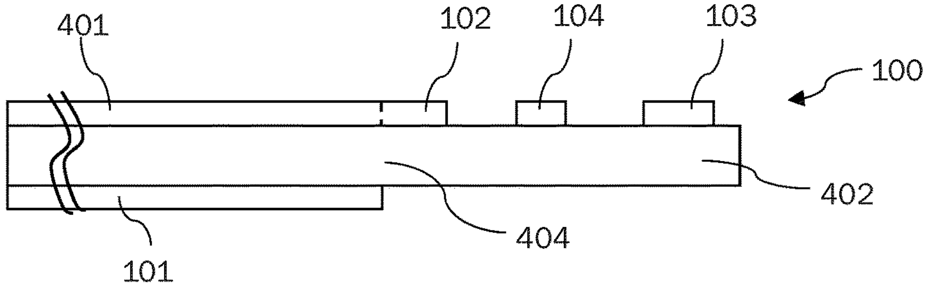
FIG. 4*b* shows schematically a cross section of an example of an antenna according to an embodiment of the invention.

As shown in FIG. 1*a* in connection with FIGS. 2*b*, 4*a* and 4*b*, a frame/encirclement of the area 106 may have a gap 404. By imagining a direct electrical contact between the ground structure 101 and the feed point 102, a frame/encirclement of the area (area element) 106 may be defined, in particular when seen from a direction perpendicular/orthogonal to the plane of the ground structure 101, to the plane of the first structure 103 and/or to the plane of the second structure 104.

In some implementations, by imagining a short at the feed point 102 between a signal line 401, which is in electrical contact with the feed point 102, and the ground structure 101, which is arranged next to the signal line 401 and which is in electrical contact with the second structure 104, a frame/encirclement of the area (area element) 106 may be defined, in particular when seen from a direction perpendicular/orthogonal to the plane of the ground structure 101, to the plane of the first structure 103 and/or to the plane of the second structure 104.

In some implementations, the area (area element) 106 may be substantially restricted by the second structure 104 and the ground structure 101 being in electrical contact with the second structure 104.

In some embodiments the antenna 100 may be a planar circuit antenna and/or a printed circuit antenna. The antenna 100 may be attached to a dielectric. The antenna may be made at least in parts of copper or a copper alloy or any other electrically conducting material.

Figure 1B:
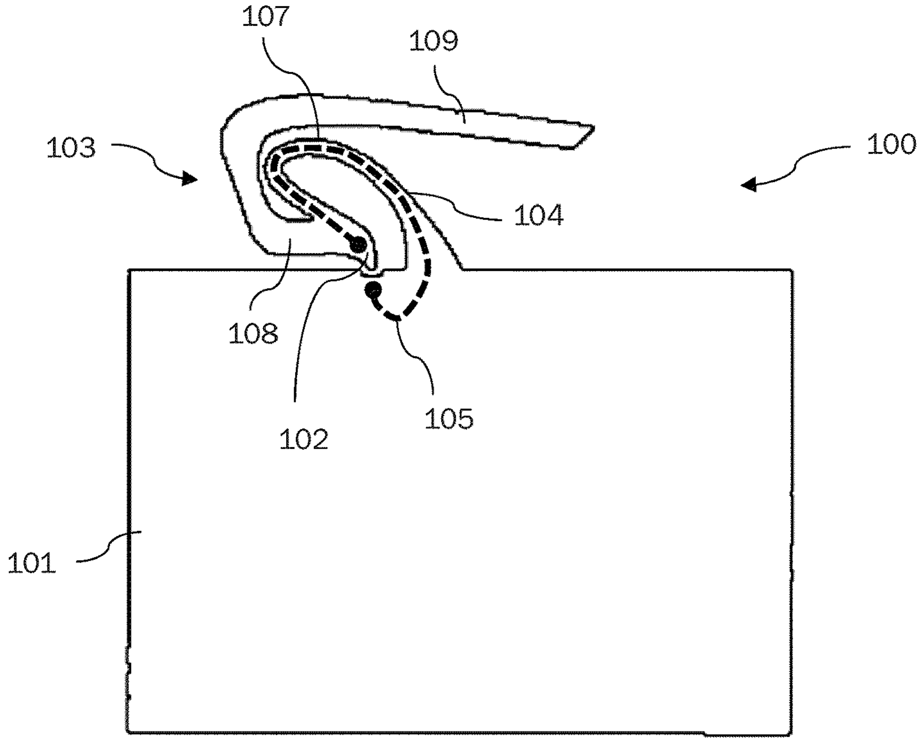
FIG. 1*b* shows schematically an example of an antenna according to an embodiment of the invention.

FIG. 1*b* shows schematically an example of an antenna according to an embodiment of the invention. The antenna 100 shown in FIG. 1*b* may refer to the antenna 100 shown in FIG. 1*a*. The antenna comprises a first structure 103 and a second structure 104, wherein a first end of the first structure 103 is in electrical contact with a first end of the second structure 104 in a feed point 102. A second end of the second structure 104 is in electrical contact with a ground structure 101. The first structure 103 and the second structure 104 are both electrically conducting.

In some embodiments and as shown in FIG. 1*b*, the second structure 104 and the ground structure 101 may form a loop 105 with a gap between the feed point 102 and the ground structure 101.

In some embodiments and as shown in FIG. 1*b*, the first structure may be substantially U-shaped. The two "legs" of the U-shaped first structure may or may not have the same length. In some embodiments, the two legs may have different lengths. in particular, a shorter leg 108 of the U-shaped first structure 103 may be in electrical contact with the feed point 102 and/or a longer leg 109 of the U-shaped first structure 103 may be electrical open.

In some embodiments at least parts of the second structure 104 may be surrounded from three sides by the first structure 103, in particular by the U-shaped first structure 103, in particular, when seen from a direction orthogonal/perpendicular to a plane of the ground structure 101, to a plane of the first structure 103 and/or to a plane of the second structure 104.

In some embodiments, this may mean that at least parts of the second structure 104 are arranged substantially between the two legs, in particular the shorter leg 108 and the longer leg 109, of the substantially U-shaped first structure 103, in particular when seen from a direction orthogonal/perpendicular to a plane of the ground structure 101, to a plane of the first structure 103 and/or to a plane of the second structure 104.

FIG. 2*a* shows schematically an example of an antenna according to an embodiment of the invention. The antenna 100 shown in FIG. 2*a* differs from the antenna 100 shown in FIGS. 1*a* and 1*b* mainly in the form of the second structure 104. In contrast to the second structure 104 of FIGS. 1*a* and 1*b*, the bending portion of the antenna 100 shown in FIG. 2*a* comprises corners. Accordingly, one or more corners may replace one or more bendings of a bending portion 107 in some embodiments.

Figure 3:
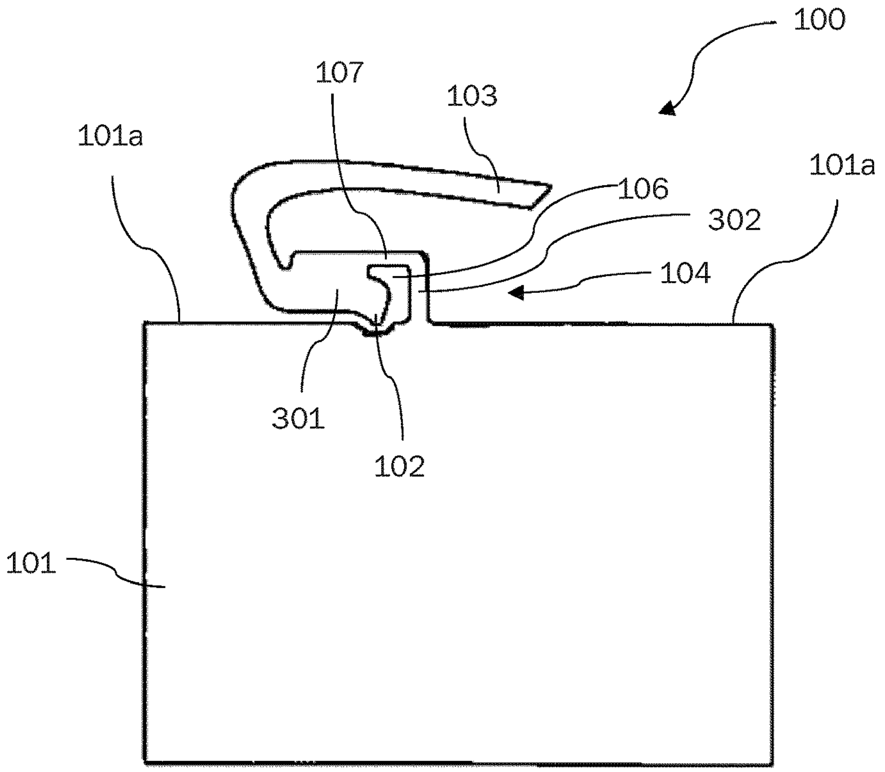
FIG. 3 shows schematically an example of an antenna according to an embodiment of the invention.

As shown in FIG. 2*a*, but also shown schematically in the FIGS. 1*a*, 1*b* and 3, the first structure 103 may have a first portion 201, a second portion 202 and a third portion 203. The second portion 202 may connect an end of the first portion 201 with an end of the third portion 203 electrically. An extension direction of the first portion 201 may have a main component in a first direction 204, in particular in parallel to a plane of the ground structure 101 and/or in parallel to an edge 101*a* of the ground structure 101. An extension direction 206 of the third portion 203 may have a main component in a second direction 206 opposite to the first direction 204. In particular, the second direction 206 may be anti-parallel to the first direction 204.

In some embodiments and as shown in FIG. 2*a*, an extension direction of the second portion 202 of the first structure 103 may have a main component in a direction 205 perpendicular to the first direction 204 and perpendicular to the second direction 206.

FIG. 2*b* shows schematically an example of an antenna according to an embodiment of the invention. The antenna 100 shown in FIG. 2*b* may refer to the antenna 100 shown in FIG. 2*a*. In FIG. 2*b*, an antenna 100 is shown, wherein the first structure 103 and the second structure 104 are in a plane with a signal line 401. The signal line 401 may be, for example, a grounded coplanar waveguide as shown in FIG. 2*a*. However, in some embodiments the signal line may be a microstrip line, a coplanar waveguide, etc.

In some embodiments several ground planes/ground structures 101 of the signal line may be connected by one or more vias/through-hole platings 209 to each other.

In FIG. 2*b*, it is shown that the antenna 100 may be attached to a dielectric 402.

FIG. 3 shows schematically an example of an antenna according to an embodiment of the invention. The antenna 100 shown in FIG. 3 differs from the antennas 100 shown in FIGS. 1*a*, 1*b*, 2*a*, 2*b* mainly in the form of the second structure 104. In FIG. 3, it is shown that parts of the first structure 103 and parts of the second structure 104 may overlap, in particular not only in the feeding point 102 but also in an area neighbouring to the feeding point. As visible by comparing the FIGS. 1*a*, 1*b*, 2*a*, 2*b*, an area 106 being at least substantially surrounded by a second structure 104 and a ground structure 101 may have different forms and sizes in several embodiments.

As shown in FIG. 3, but also shown schematically in the FIGS. 1*a*, 1*b*, 2*a*, 2*b*, the second structure 104 may comprise a first portion 301 attached to the feed point 102 and extending away from a ground structure 101. Further, the second structure 104 may comprise a second portion 302 being in electrical contact with the ground structure 101. A distal end of the first portion 301 may be electrically connected to a distal end of the second portion 302 by a bending portion 107.

In some embodiments and as shown in FIGS. 1*a*, 1*b*, 2*a*, 2*b* and 3, the ground structure 101 may form an edge 101*a* in at least one of a plane of the first structure 103 and a plane of the second structure 104.

Preferably, the first structure 103, the second structure 104 and/or the ground structure 101 may be attached to a dielectric substrate.

FIG. 4*a* shows schematically a cross-section of an example of an antenna according to an embodiment of the invention. The antenna 100 shown in FIG. 4*a* may relate to the antenna 100 shown in FIG. 2*a* and the cross-section shown in FIG. 4*a* may relate schematically to a cutting plane A shown in FIG. 2*a*.

The antenna 100 is attached to a dielectric 402. Further, a ground structure 101 and a signal line 401 are attached to the dielectric 402. The antenna 100 comprises in accordance with the antennas 100 shown in FIGS. 1*a*, 1*b*, 2*a*, 2*b*, 3 a first structure 103 and a second structure 104, which are in electrical contact at the feed point 102 not being evident from FIG. 4*a* but from FIGS. 1*a*, 1*b*, 2*a*, 2*b*, 3.

In this embodiment, the signal line 401 is in a plane different from a plane of the antenna 100. The signal line 401 is electrically connected by one or more vias/through-hole platings 403 to the feed point 102. Further, it is shown that there is a gap 404 between the ground structure 101 and the feed point 102.

FIG. 4*b* shows schematically a cross section of an example of an antenna according to an embodiment of the invention. The antenna 100 shown in FIG. 4*b* may relate to the antenna 100 shown in FIG. 2*b* and a cross-section shown in FIG. 4*b* may relate schematically to a cutting plane B shown in FIG. 2*b*. The antenna 100, a ground structure 101 and a signal line 401 may be attached to a dielectric 402.

In contrast to the antennas 100 shown in FIGS. 2*a* and 4*a*, the antenna 100 shown in FIG. 4*b* is arranged in a plane with a signal line 401, which is in electrical contact with a feed point 102 of the antenna 100. The antenna 100 comprises in accordance with the antennas 100 shown in FIGS. 1*a*, 1*b*, 2*a*, 2*b*, 3 a first structure 103 and a second structure 104, which are in electrical contact at the feed point 102 not being evident from FIG. 4*b* but from FIGS. 1*a*, 1*b*, 2*a*, 2*b*, 3.

In dependence on a configuration of the signal line 401, like a micro strip line, a coplanar waveguide, etc., a second end of the second structure 104 may be in electrical contact with the ground structure 101 or may be electrically connected by one or more vias/through-hole platings to the ground structure 101 as shown in FIG. 2*b*.

Further, a gap 404 between the feed point 102 and the ground structure 101 may be arranged perpendicular to a plane of the antenna 100.

As shown in FIGS. 4*a* and 4*b* in connection with FIGS. 2*a* and 2*b*, respectively, when seen from a direction orthogonal to the plane of the ground structure 101 or orthogonal to the plane of the antenna 100, a complete or at least parts of a surrounding behind and in front of the first and/or the second structure 103, 104 may be free from the ground structure and/or no ground structure may be arranged behind or in front of the first and/or the second structure.

Figure 5:
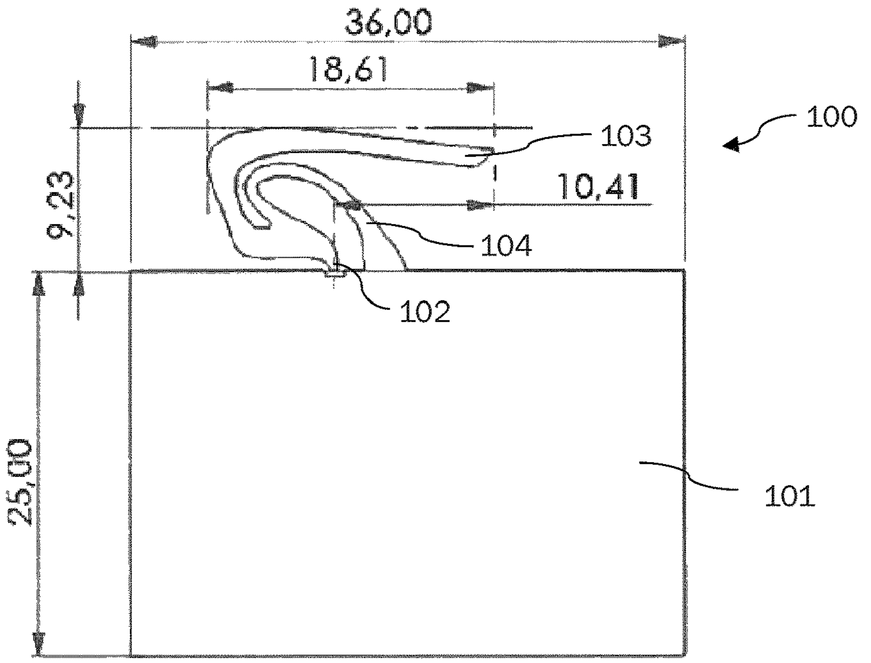
FIG. 5 shows schematically an example of an antenna according to an embodiment of the invention.

FIG. 5 shows schematically an example of an antenna according to an embodiment of the invention. The antenna 100 shown in FIG. 5 may refer to an antenna 100 shown in FIG. 1 having a centre frequency of 2.4 GHz. In FIG. 5, it is shown that the antenna 100 may have a horizontal overall size of 18.61 mm and a vertical overall size of 9.23 mm. Further, it is shown that a second end of a first portion 103 of the antenna 100 may be spaced away 10.41 mm in a horizontal direction from a feed point 102 of the antenna 100.

As an example, the ground structure 101 may have a horizontal size of 36 mm. In some embodiments, a vertical size of the ground structure 101 may be of 25 mm.

Figure 6:
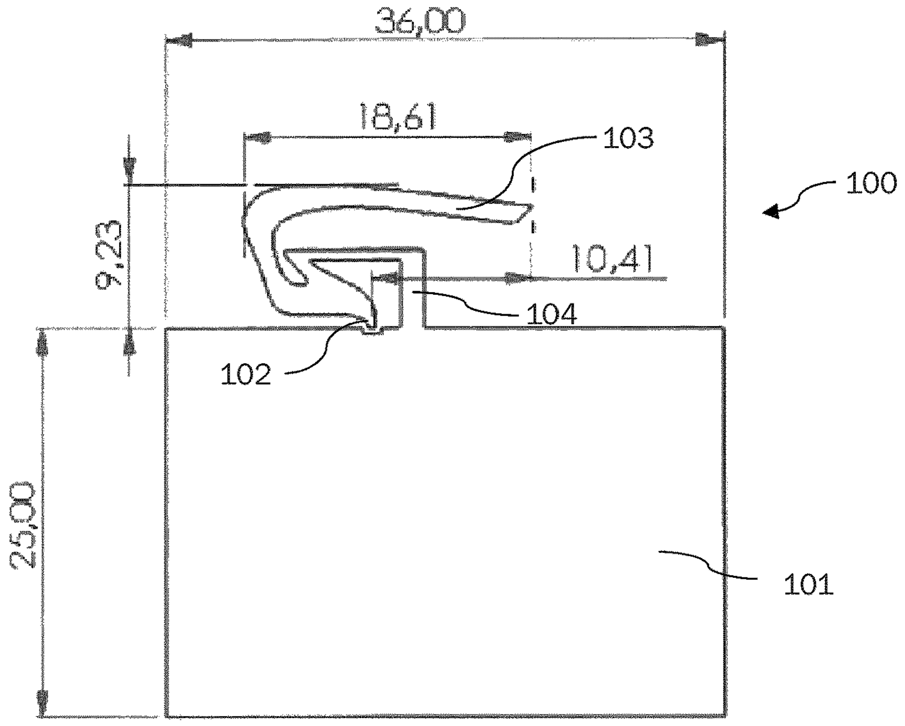
FIG. 6 shows schematically an example of an antenna according to an embodiment of the invention.

FIG. 6 shows schematically an example of an antenna according to an embodiment of the invention. The antenna 100 shown in FIG. 6 may refer to antennas 100 shown in FIG. 2*a* or 2*b* having a centre frequency of 2.4 GHz. With regard to FIG. 5, it is shown in FIG. 6 that, although the form of the antenna 100 differs, the overall sizes are identical. Namely, the antenna 100 may have a horizontal overall size of 18.61 mm and a vertical overall size of 9.23 mm. Further, it is shown that a second end of a first portion 103 of the antenna 100 may be spaced away 10.41 mm in a horizontal direction from a feed point 102 of the antenna 100.

Again, as an example only, the ground structure 101 may have a horizontal size of 36 mm. In some embodiments, a vertical size of the ground structure 101 may be of 25 mm.

Figure 7:
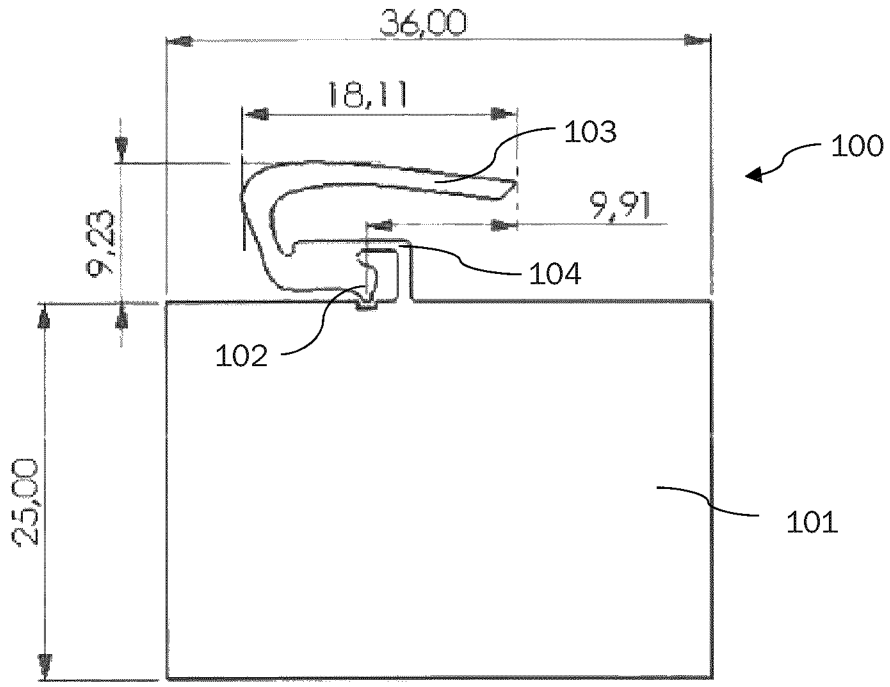
FIG. 7 shows schematically an example of an antenna according to an embodiment of the invention.

FIG. 7 shows schematically an example of an antenna according to an embodiment of the invention. The antenna 100 shown in FIG. 7 may refer to an antenna 100 shown in FIG. 3 having a centre frequency of 2.4 GHz. As shown in FIG. 7, an overall vertical size of the antenna 100 is 9.23 mm. However, an overall horizontal size of the antenna 100 may be reduced to 18.11 mm. Further, it is shown that a second end of a first portion 103 of the antenna 100 may be spaced away 9.91 mm in a horizontal direction from a feed point 102 of the antenna 100.

Again, as an example only, the ground structure 101 may have a horizontal size of 36 mm. In some embodiments, a vertical size of the ground structure 101 may be of 25 mm.

Figure 8:
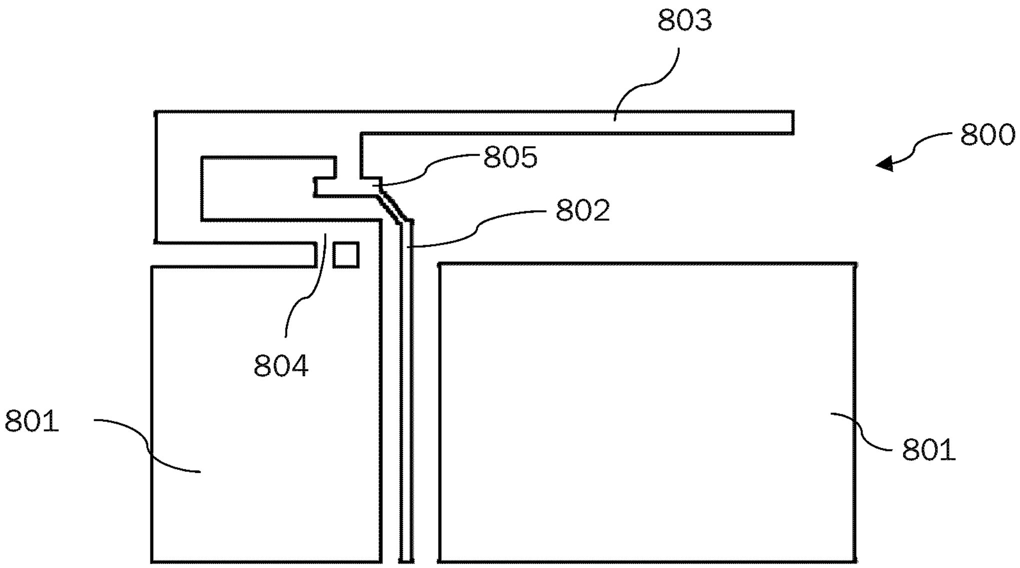
FIG. 8 shows schematically a planar inverted F-shaped antenna (PIFA) as known from the prior art.

FIG. 8 shows schematically a planar inverted F-shaped antenna (PIFA) as known from the prior art. As shown in FIG. 8 the PIFA antenna 800 comprises a feed point 802, which is electrically connected to a first structure 803 by a feed structure 805 in a section spaced away from ends of the first structure 803. The first structure 803 has the function of a radiator.

Further, the PIFA antenna 800 comprises a second structure 804 being in electrical contact at a first end with a first end of the first structure 803. A second end of the second structure 804 is twice in electrical contact with a ground structure 801.

Figure 9A:
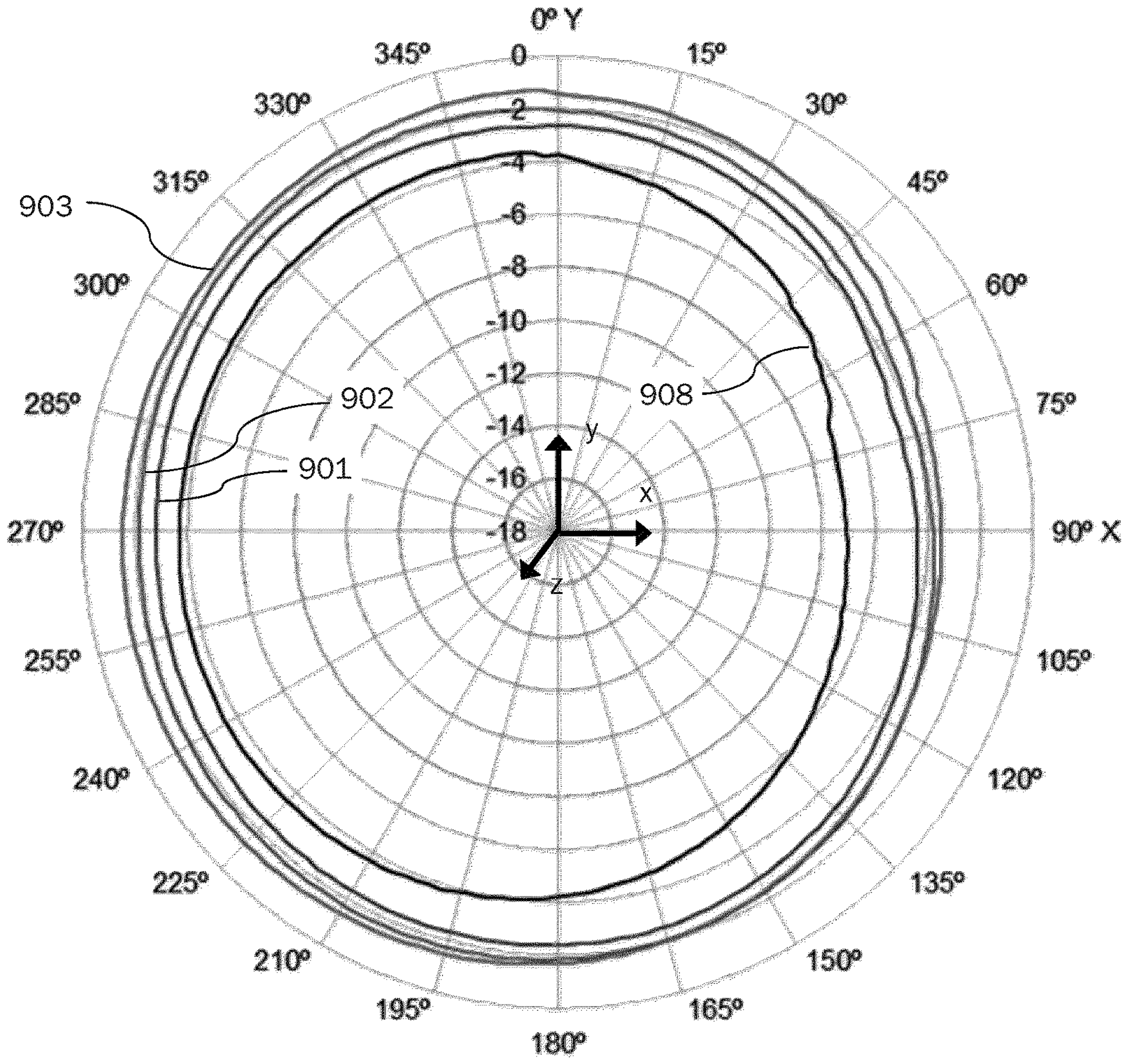
FIG. 9*a* shows schematically a radiation pattern of the antennas shown in FIG. 5, 6, 7, 8 at a frequency of 2.4 GHz.
Figure 9B:
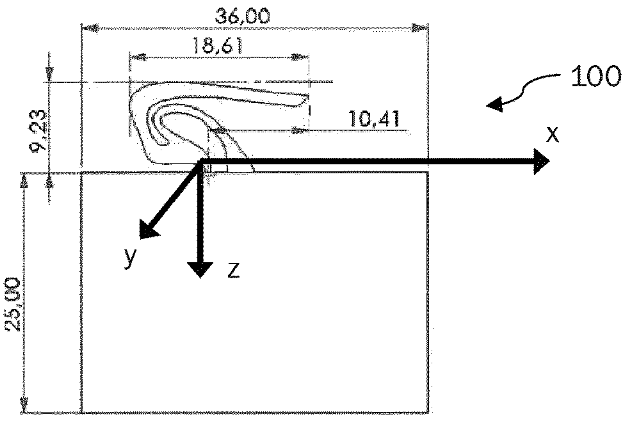
FIG. 9*b* shows an antenna 100 as shown in FIG. 5 relative to a coordinate system of the radiation pattern as shown in FIG. 9*a*.
Figure 9C:
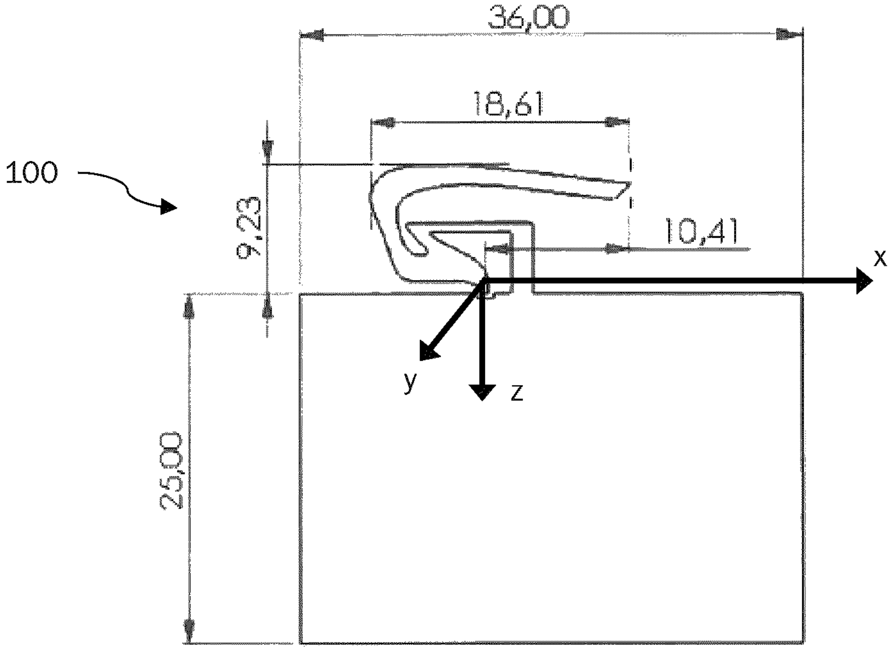
FIG. 9*c* shows an antenna 100 as shown in FIG. 6 relative to the coordinate system of the radiation pattern as shown in FIG. 9*a*.
Figure 9D:
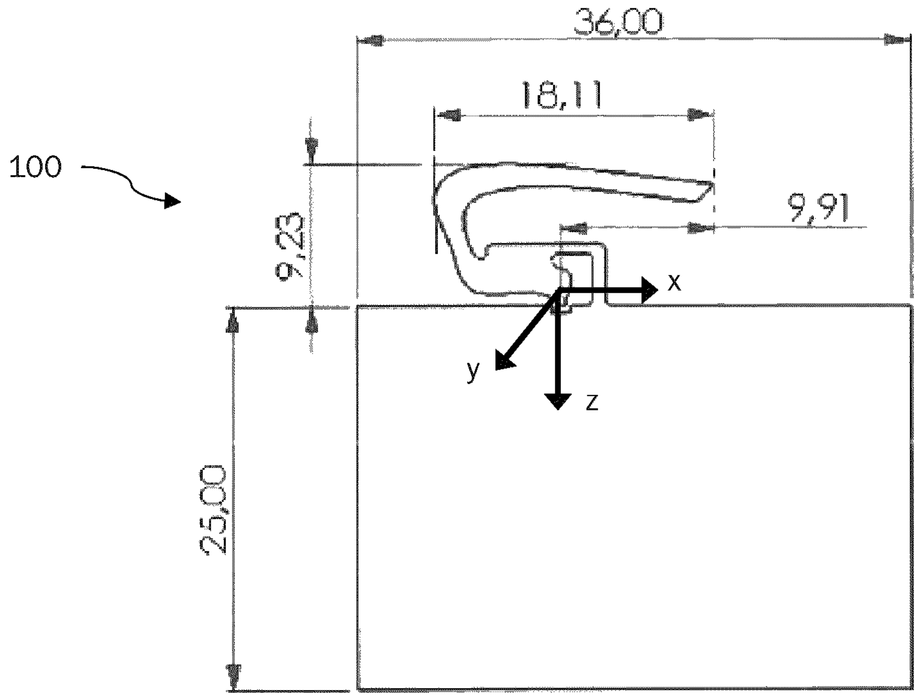
FIG. 9*d* shows an antenna 100 as shown in FIG. 7 relative to the coordinate system of the radiation pattern as shown in FIG. 9*a*.
Figure 9E:
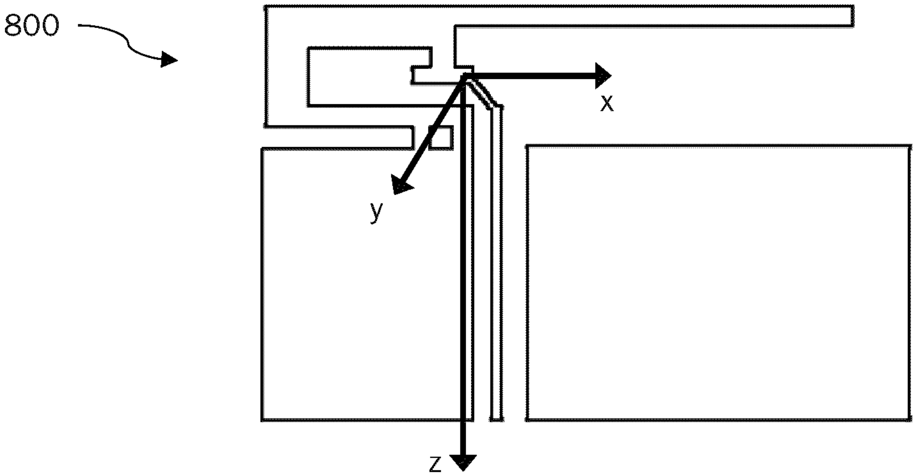
FIG. 9*e* shows an antenna 800 as shown in FIG. 8 relative to the coordinate system of the radiation pattern as shown in FIG. 9*a*.

FIG. 9*a* shows schematically a radiation pattern of the antennas shown in FIGS. 5, 6, 7, 8 at a frequency of 2.4 GHz. FIG. 9*b* shows an antenna 100 as shown in FIG. 5 relative to a coordinate system of the radiation pattern as shown in FIG. 9*a*. FIG. 9*c* shows an antenna 100 as shown in FIG. 6 relative to the coordinate system of the radiation pattern as shown in FIG. 9*a*. FIG. 9*d* shows an antenna 100 as shown in FIG. 7 relative to the coordinate system of the radiation pattern as shown in FIG. 9*a*. FIG. 9*e* shows an antenna 800 as shown in FIG. 8 relative to the coordinate system of the radiation pattern as shown in FIG. 9*a*.

The coordinate systems shown in FIGS. 9*a* to 9*e* comprise a x-direction, a y-direction and a z-direction in the order x-y-z. The coordinate systems are right-handed coordinate systems.

In FIG. 9*a*, a graph 901 shows a power density in a x-y-plane of the antenna 100 shown in FIG. 9*b*, a graph 902 shows a power density in the x-y-plane of the antenna 100 shown in FIG. 9*c*, and a graph 903 shows a power density in the x-y-plane of the antenna 100 shown in FIG. 9*d*. Further, a graph 908 shows a power density in the x-y-plane of the antenna 800 shown in FIG. 9*e*.

As shown in FIG. 9*a*, the power density 908 of a PIFA antenna 800 as shown in FIG. 9*e* is—independent from an azimuth angle—less than the power density 901, 902, 903 of the antenna 100. Further, it is shown that the radiation pattern of the PIFA antenna 800 as shown in FIG. 9*e* has in a negative x-direction (at 270°) a value of around −3.8 dB and in a positive x-direction (at 90°) a value of around −7 dB. As a result, the values of the positive x-direction and negative x-direction of the radiation pattern 908 of the PIFA antenna 800 differ by a value of 3.2 dB.

In comparison, the radiation pattern 901 of the antenna 100 as shown in FIG. 9*b* has in a negative x-direction (at 270°) a value of around −2.9 dB and in a positive x-direction (at 90°) a value of around −4.5 dB. As a result, the values of the positive x-direction and negative x-direction of the radiation pattern 901 of the antenna 100 as shown in FIG. 9*b* differ by a value of around 1.6 dB.

Further, the radiation pattern 902 of the antenna 100 as shown in FIG. 9*c* has in a negative x-direction (at 270°) a value of around −2.1 dB and in a positive x-direction (at 90°) a value of around −3.9 dB. As a result, the values of the positive x-direction and negative x-direction of the radiation pattern 902 of the antenna 100 as shown in FIG. 9*b* differ by a value of around 1.8 dB.

The radiation pattern 903 of the antenna 100 as shown in FIG. 9*d* has in a negative x-direction (at 270°) a value of around −1.4 dB and in a positive x-direction (at 90°) a value of around −3.5 dB. As a result, the values of the positive x-direction and negative x-direction of the radiation pattern 903 of the antenna 100 as shown in FIG. 9*b* differ by a value of around 2.1 dB.

Summarizing, it is shown that an antenna 100 according to the invention may have a more uniform radiation pattern than a PIFA antenna 800 as known from the state of the art.

Figure 10:
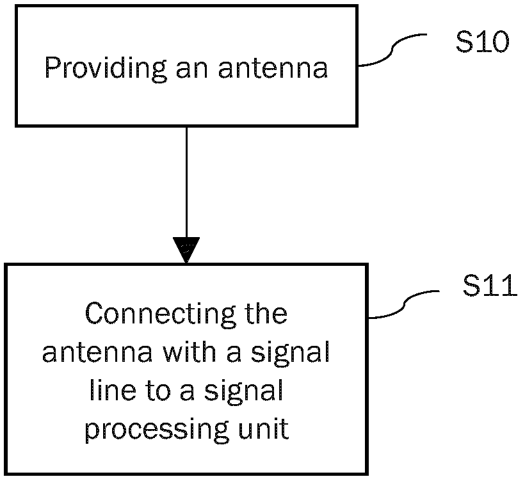
FIG. 10 shows schematically a process flow of a method according to an embodiment of the invention.

FIG. 10 shows schematically a process flow of a method according to an embodiment of the invention. In a first step S10 an antenna 100, in particular an antenna 100 as described in one of FIGS. 1*a*, 1*b*, 2*a*, 2*b*, 3, 4*a*, 4*b*, 5, 6, 7 may be provided. In a further step S11, the antenna 100 may be connected at a feed point 102 with a signal line 401 to a signal processing unit. In some embodiments, the signal processing unit may generate signals for being transmitted by the antenna 100 and/or the signal processing unit may process signals received by the antenna 100. Generating signals for being transmitted by the antenna 100 may also comprise signal processing. Signal processing may be done analogous or digital. In some embodiments a signal processing unit may comprise an digital-to-analog converter and/or an analog-to-digital converter.

The method may have the advantage that transmitting of signals between the antenna 100 and another antenna may be very efficient and robust with regard to noise independent to an relative orientation of the antenna 100 with respect to the another antenna communicating with the antenna 100.

The invention claimed is:

1. An antenna for sending and/or receiving electromagnetic signals, comprising:
- an electrically conducting ground structure extending along a plane;
- a first structure forming a radiator, being electrically conducting;
- a second structure, being electrically conducting; and
- a feed point for connecting the antenna with a signal line;

wherein
- a first end of the first structure and a first end of the second structure are in electrical contact with each other at the feed point,
- the ground structure is separated from the feed point by a gap;
- a second end of the second structure is connected to the ground structure;
- the second structure comprises a bending portion such that the second structure together with a portion of the ground structure surround an area when seen from a direction orthogonal to the plane of the ground structure,
- the first structure is substantially U-shaped, and
- at least parts of the second structure are surrounded from three sides by the first structure.

2. The antenna according to claim 1, wherein
- the second structure comprises a first portion attached to the feed point extending away from the ground structure and a second portion attached to the ground structure extending away from the ground structure, wherein distal ends of the first and second portions are connected by the bending portion, and/or
- the second structure and the ground structure form a loop with the gap between the feed point and the ground structure.

3. The antenna according to claim 1, wherein
- the antenna is a planar circuit antenna.

4. The antenna according to claim 1, wherein
- a shorter leg of the U-shaped first structure is connected with the feed point and a longer leg of the U-shaped radiator is open.

5. The antenna according to claim 1, wherein
- the feed point is a 50 Ohm feed point.

6. The antenna according to claim 1, wherein the first structure has a first portion, a second portion, and a third portion, wherein the second portion connects an end of the first portion with an end of the third portion;

an extension direction of the first portion of the first structure has a main component in a first direction in a plane parallel to the ground structure; and an extension direction of the third portion has a main component in a second direction opposite to the first direction.

7. The antenna according to claim 6, wherein an extension direction of the second portion of the first structure has a main component in a direction perpendicular to the first and second directions.

8. The antenna according to claim 1, wherein the ground structure forms an edge in at least one of a ground plane of the signal line, a plane of the first structurer, or a plane of the second structure.

9. The antenna according to claim 1, wherein the first structure and the second structure are attached to a dielectric substrate.

10. The antenna according to claim 1, wherein, when seen from the direction orthogonal to the plane of the ground structure, the surrounding behind and in front of the first and/or the second structure is free from the ground structure and/or no ground structure is arranged behind or in front of the first and/or the second structure.

11. A method for using an antenna for sending and/or receiving electromagnetic signals comprising the step of:

connecting the antenna according to claim 1 to a signal processing unit.

* * * * *